United States Patent
Yin

(10) Patent No.: US 8,270,422 B2
(45) Date of Patent: Sep. 18, 2012

(54) ACTIVE/STANDBY SWITCHOVER METHOD AND DEVICE OF ASYNCHRONOUS BACKPLANE IN TRANSPORT NETWORK

(75) Inventor: Hui Yin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 451 days.

(21) Appl. No.: 12/493,583

(22) Filed: Jun. 29, 2009

(65) Prior Publication Data

US 2009/0324215 A1 Dec. 31, 2009

(30) Foreign Application Priority Data

Jun. 30, 2008 (CN) .......................... 2008 1 0129178

(51) Int. Cl.
*H04L 12/56* (2006.01)
(52) U.S. Cl. .................. 370/412; 370/504; 398/155
(58) Field of Classification Search .......... 370/216–228, 370/395.62, 503–504, 509–515, 520, 363, 370/368, 371, 374, 378, 381, 383, 394, 395.71, 370/395.72, 412–421; 398/154–155; 709/250; 711/104, 105
See application file for complete search history.

(56) References Cited

U.S. PATENT DOCUMENTS

| | | | |
|---|---|---|---|
| 4,680,779 A | | 7/1987 | Wakerly |
| 5,331,667 A | * | 7/1994 | Izumi ............................ 370/503 |
| 5,475,676 A | * | 12/1995 | Takatori et al. ............... 370/217 |
| 5,530,726 A | | 6/1996 | Ohno |
| 5,570,397 A | | 10/1996 | Kubista |
| 5,627,826 A | * | 5/1997 | Kameda et al. ................ 370/371 |
| 7,283,549 B2 | * | 10/2007 | Lin ................................. 370/413 |
| 2002/0154658 A1 | * | 10/2002 | Song ............................. 370/503 |
| 2004/0042474 A1 | * | 3/2004 | Walker et al. ................. 370/412 |
| 2006/0078054 A1 | | 4/2006 | Gudmundson et al. |
| 2006/0146888 A1 | | 7/2006 | Den Hollander et al. |
| 2008/0151765 A1 | | 6/2008 | Cheruvathery |

OTHER PUBLICATIONS

Extended European Search Report in corresponding European Patent Application No. 09164157.1 (Aug. 27, 2009).
"G.709/Y.1331—Series G: Transmission Systems and Media, Digital Systems and Networks; Series Y: Global Information Infrastructure, Internet Protocol Aspects and Next Generation Networks," ITU-T G-Series Recommendations, Mar. 2003, International Telecommunication Union, Geneva, Switzerland.

* cited by examiner

Primary Examiner — Jeffrey M Rutkowski
(74) Attorney, Agent, or Firm — Leydig, Voit & Mayer, Ltd.

(57) ABSTRACT

An active/standby switchover device and an active/standby switchover method of an asynchronous backplane in a transport network are provided. A local oscillator clock is adopted to obtain a clock of a working path, so as to replace the clock of the working path tracked in a phase-locked loop mode. An active/standby switchover operation is realized by using the local oscillator clock, so that the implementation cost is greatly reduced, and the hysteresis problem of the phase-locked loop tracking clock during the active/standby clock switchover is eliminated, thereby effectively achieving the lossless switchover of services.

8 Claims, 4 Drawing Sheets

ACTIVE/STANDBY SWITCHOVER METHOD AND DEVICE OF ASYNCHRONOUS BACKPLANE IN TRANSPORT NETWORK

CROSS-REFERENCE TO RELATED APPLICATIONS

This application claims priority to Chinese Patent Application No. 200810129178.0, filed Jun. 30, 2008, which is hereby incorporated by reference in its entirety.

FIELD OF THE TECHNOLOGY

The present disclosure relates to the field of communication technology, and more particularly to an active/standby switchover method and device of an asynchronous backplane in an optical transport network (OTN).

BACKGROUND

Currently, a widely applied network protection mechanism adopts a path layer protection/recovery technology, so as to realize a recovery of a network failure and achieve better whole network security. An active/standby switchover protection of a backplane service is one of the key technologies relevant to a protection/recovery mechanism of a path layer. In the OTN network, the active/standby switchover protection of the asynchronous backplane is a critical technology for survivability of the OTN network, and this technology requires that no loss occurs during the active/standby switchover of the asynchronous backplane, i.e., no bit error is generated, no clock performance is deteriorated during a normal active/standby switchover, and a switchover service is recoverable when an active/standby service fails.

In the conventional art, a lossless switchover of the asynchronous backplane usually adopts a switchover clock tracked by a phase-locked loop, as shown in FIG. 1. A Path 0 clock recovering unit performs a clock recovery on a Path 0 service, and outputs a Path 0 recovery service and a Path 0 recovery clock. A Path 0 random access memory (RAM) unit stores the Path 0 recovery service into the Path 0 RAM unit by using the Path 0 recovery clock. A Path 1 clock recovering unit performs a clock recovery on a Path 1 service, and outputs a Path 1 recovery service and a Path 1 recovery clock. A Path 1 RAM unit stores the Path 1 recovery service into the Path 1 RAM unit by using the Path 1 recovery clock.

The Path 0 recovery clock and the Path 1 recovery clock are output to a phase-locked loop for phase-locked tracking of the clock after the active/standby selection. That is, when a main path is switched to Path 0, the phase-locked loop automatically tracks the Path 0 recovery clock to obtain a switchover clock, and when the main path is switched to Path 1, the phase-locked loop automatically tracks the Path 1 recovery clock to obtain a switchover clock. The Path 0 RAM and the Path 1 RAM respectively buffer path service data, align the stored service data by using the switchover clocks, and output the data. Finally, through the active/standby selection control, the Path 0 aligned data output by the Path 0 RAM or Path 1 aligned data output by the Path 1 RAM are selected and output as the active/standby switchover data.

During researches and practices, the inventor finds that the conventional art has the following defects.

In the conventional art, each path requires a phase-locked loop to realize the active/standby clock switchover, so that the multi-path integration definitely increases the circuit implementation cost. Further, due to the limitation of the inherent tracking capability of the phase-locked loop, it takes some time for the phase-locked loop to lock the working path (main path) recovery clock during the service switchover, which may lead to a path RAM overflow. As a result, the output active/standby switchover data may appear to be "normal-error-normal", so that the downstream network stations initiate an alarm, thereby affecting the protection mechanism of the whole network.

SUMMARY

Accordingly, the embodiment of the present disclosure is directed to an active/standby switchover method and an active/standby switchover system of an asynchronous backplane in a transport network, so as to realize a lossless switchover between active/standby path data without introducing additional jittering to affect downstream clock performances.

An active/standby switchover device of an asynchronous backplane in a transport network is provided in an embodiment of the present disclosure. The device includes a switchover controlling unit, an active/standby switchover data selecting unit, and at least two paths, in which each path is provided with a path clock data recovering unit and a path data storing unit.

The switchover controlling unit is adapted to generate a clock gap.

The path clock data recovering unit is adapted to receive service data from an external path and extract a path recovery clock from the service data.

The path data storing unit is adapted to store the service data received by the path clock data recovering unit according to the path recovery clock, align the service data, obtain a clock of a working path by using a local oscillator clock and the clock gap provided by the switchover controlling unit, and then output the aligned service data according to the clock of the working path.

The active/standby switchover data selecting unit is adapted to select normal path aligned data as the working path data for outputting from the two paths.

An active/standby switchover method applied to an asynchronous backplane in a transport network is provided in an embodiment of the present disclosure, which is applied to a system including a switchover controlling unit and at least two paths, and each of the paths is provided with a path data storing unit. The method includes the following blocks.

Service data from the at least two paths are respectively received, a path recovery clock is respectively extracted from the service data, the service data is respectively stored according to the path recovery clock, and then aligned.

A difference value between a read address generated by the switchover controlling unit and a write address generated by the path data storing unit is calculated in each clock period of the at least two paths to serve as a water line, and the difference value is output as the water line. Then, a clock of a working path is obtained by using a local oscillator clock and a clock gap provided by the switchover controlling unit, and the aligned data is then output.

When one of the at least two paths fails, a normal path is selected as the working path.

A computer readable medium is provided in an embodiment of the present disclosure, which includes program codes stored thereon for instructing one or more digital processors. The program codes include: instructions for receiving service data from the at least two paths respectively, extracting a path recovery clock from the service data respectively, storing the service data respectively according to the path recovery clock and aligning the service data respectively; instructions for calculating a difference value between a read address generated by a switchover controlling unit and a write address generated by a path data storing unit in each clock period of the at least two paths, and outputting the difference value as a water line, obtaining a clock of a working path by using a local oscillator clock and a clock gap provided by the switchover controlling unit and outputting the aligned data; and instructions for selecting a normal path as the working path when one of the at least two paths fails.

In the embodiments of the present disclosure, a clock of the working path obtained by using the local oscillator clock and the clock gap is adapted to replace the clock of the working path tracked in a phase-locked loop mode. An active/standby switchover operation is realized by using the local oscillator clock, so that the implementation cost is greatly reduced. Moreover, due to the use of the clock gap, the clock jittering during the switchover is reduced. In addition, as the data is read by the local oscillator clock, the data is ensured to be read in time.

DETAILED DESCRIPTION

Figure 1:
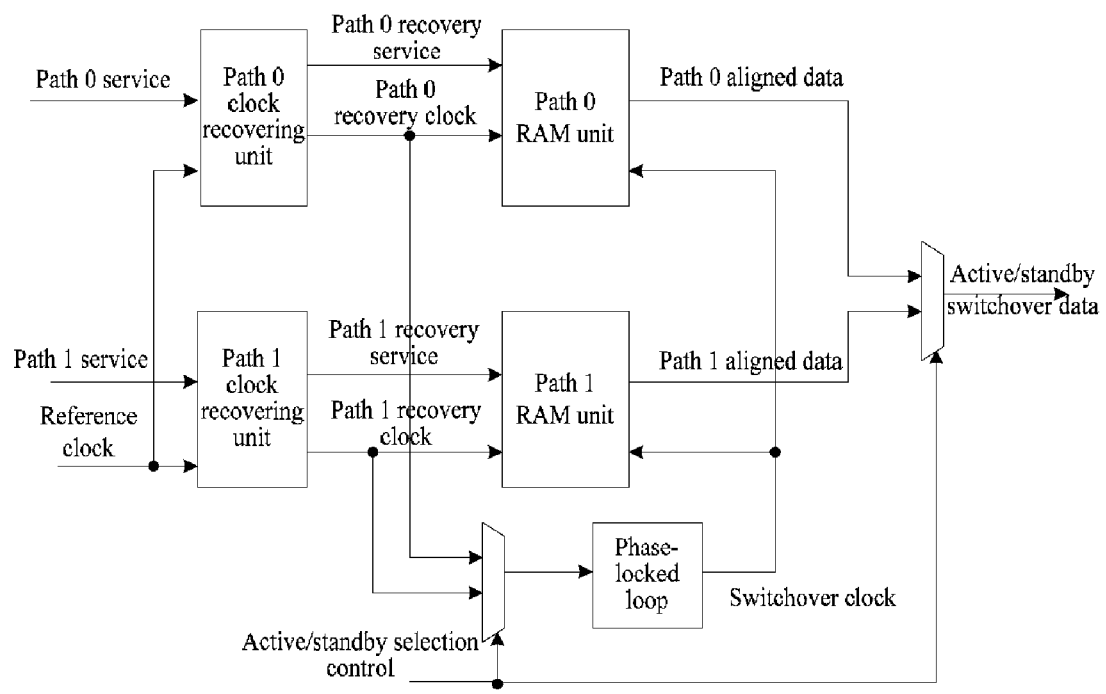
FIG. 1 is a schematic view of data path switchover by using a switchover clock tracked by a phase-locked loop in the conventional art.
Figure 2:
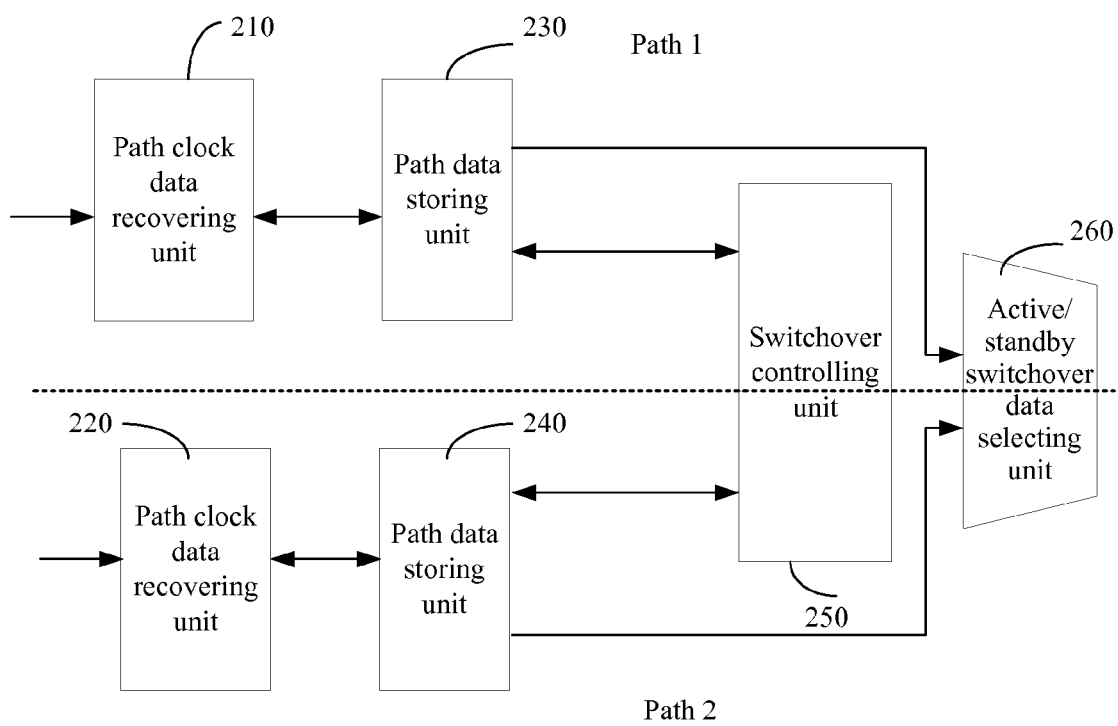
FIG. 2 is a diagram of an active/standby switchover device of an asynchronous backplane in an OTN according to a first embodiment of the present disclosure.

In a first embodiment of the present disclosure, an active/standby switchover device of an asynchronous backplane in an OTN is provided, as shown in FIG. 2. The device includes a switchover controlling unit 250, an active/standby switchover data selecting unit 260, and at least two paths (for example, two paths: Path 1 and Path 2), in which each path is provided with a path clock data recovering unit and a path data storing unit. That is, Path 1 includes a path clock data recovering unit 210 and a path data storing unit 230, and Path 2 includes a path clock data recovering unit 220 and a path data storing unit 240. The switchover controlling unit 250 is adapted to generate a clock gap. The path clock data recovering units 210 and 220 are respectively adapted to receive service data from an external path and extract a path recovery clock from the service data. The path data storing units 230 and 240 are respectively adapted to store the service data received by the path clock data recovering units 210 and 220 according to the corresponding path recovery clock, align the service data, obtain a simulated clock of a working path (the working path is a path currently adopted for data transmission) by using a high-speed local oscillator clock and the clock gap provided by the switchover controlling unit, and then output the aligned data. When one path aligned data in the path aligned data output by the two path data storing units fails, the active/standby switchover data selecting unit 260 selects the other normal path aligned data as the working path data for outputting.

The path data storing unit 230 or 240 includes a data writing unit, a water line output unit, and a data reading unit. The data writing unit is adapted to store the service data received by the path clock data recovering unit according to the path recovery clock, and fixedly write a frame header of the service data into an initial address of the path data storing unit. The water line output unit is adapted to calculate a difference value between a read address and a write address in each clock period to serve as a water line, and output the water line to the switchover controlling unit, in which the water line is output as a difference value between a read address rate and a write address rate in a unit time. The data reading unit is adapted to mix the high-speed local oscillator clock with the clock gap provided by the switchover controlling unit, lower a frequency of the high-speed local oscillator clock to obtain a simulated clock of the working path, and output the aligned data in the data writing unit corresponding to a read address generated by the switchover controlling unit according to the obtained clock of the working path.

The switchover controlling unit 250 includes a water line receiving unit, a phase discriminator water line generation unit, a clock gap generating unit, and a read address generating unit. The water line receiving unit is adapted to receive the water lines sent by the path data storing units. The phase discriminator water line generation unit is adapted to latch the water line output by the current working path (main path) as a phase discriminator water line. The clock gap generating unit is adapted to generate a clock gap according to the phase discriminator water line and the received water lines. The read address generating unit is adapted to obtain a read address according to the clock gap.

The clock gap generating unit specifically includes a detecting sub-unit and an adjusting sub-unit. The detecting sub-unit is adapted to detect the water line of the current working path and the phase discriminator water line. The adjusting sub-unit is adapted to: switch the clock gap to a rapid gap mode when it is detected that the water line of the selected working path is lower than the phase discriminator water line; switch the clock gap to a slow gap mode when it is detected that the water line of the selected working path is higher than the phase discriminator water line; and alternately switch between the rapid gap mode and the slow gap mode when it is detected that the water line of the selected working path is equal to the phase discriminator water line. In the embodiments of the present disclosure, a clock of the working path obtained by using the high-speed local oscillator clock and the clock gap is adapted to replace the clock of the working path tracked in a phase-locked loop mode. An active/standby switchover operation is realized by using the high-speed local oscillator clock, so that the implementation cost is greatly reduced. Moreover, due to the use of the clock gap, the clock jittering during the switchover is reduced. In addition, as the data is read by the high-speed local oscillator clock, the data is ensured to be read in time and less error.

Figure 3:
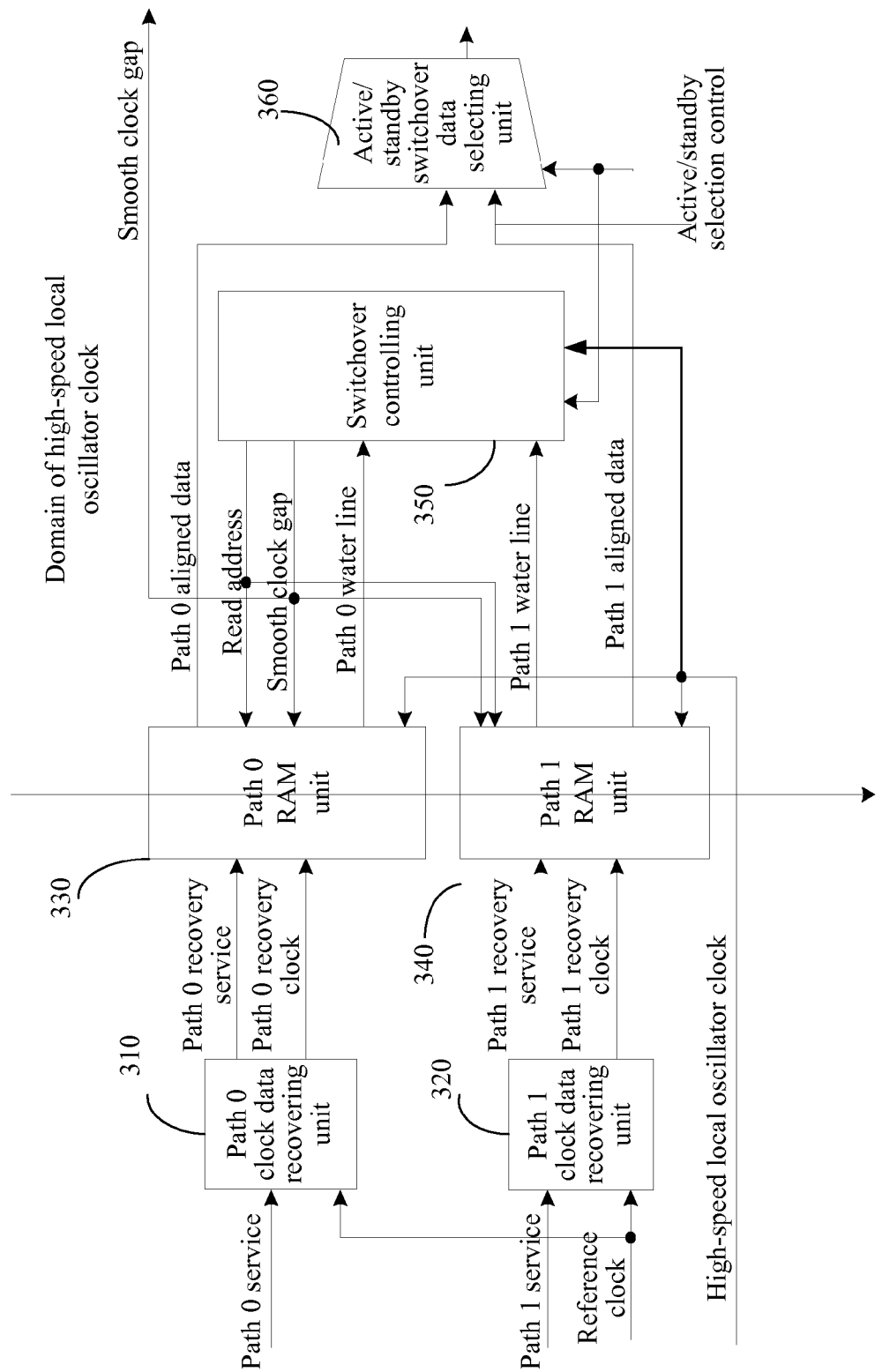
FIG. 3 is a diagram of an active/standby switchover device of an asynchronous backplane in an OTN according to a second embodiment of the present disclosure.

A specific application of an active/standby switchover device of an asynchronous backplane in an OTN is provided according to a second embodiment of the present disclosure, as shown in FIG. 3. The device includes a Path 0 clock data recovering unit (a first path clock data recovering unit) 310, a Path 1 clock data recovering unit (a second path clock data recovering unit) 320, a Path 0 RAM unit (a first path data storing unit) 330, a Path 1 RAM unit (a second path data storing unit) 340, a switchover controlling unit 350, and an active/standby switchover data selecting unit 360.

The Path 0 clock data recovering unit 310 and the Path 1 clock data recovering unit 320 have the same working principle, and both of them are adapted to receive service data from an external optical transmission path, and extract a path recovery clock from the received service data, which usually sample the input service data by using a reference clock, and recover the path recovery clock carried in the service data by making use of the transition between 0 and 1 of the data.

The Path 0 RAM unit 330 and the Path 1 RAM unit 340 have the same working principle, and both of them are adapted to buffer and align the service data. The aligning the data is implemented as follows. Each service data is written into a buffer with a fixed frame header. For example, the frame header is fixedly written into Byte 0 of the buffer, and the subsequent data is sequentially written into the buffer. In this manner, when the service data are read, all the service data are read beginning from Byte 0, thereby ensuring the alignment of the service data when being output. Each path RAM unit stores the service data recovered by each of the path clock data recovering units according to the path recovery clock respectively, fixedly writes a frame header of the service data into an initial address of each of the path clock data recovering units, then calculates a difference value between a read address and a write address in each clock period to serve as a water line, and outputs the water lines to the switchover controlling unit 350. The path RAM units lower a frequency of the high-speed local oscillator clock by using the high-speed local oscillator clock together with the clock gap provided by the switchover controlling unit, so as to obtain a simulated clock of the working path, and read the data at a read address generated by the switchover controlling unit according to the obtained clock of the working path. As the Path 0 RAM unit and the Path 1 RAM unit both fixedly write the frame header of the service data into the initial address of the write path clock data recovering units, when the services of the two path are in normal operation and under a required delay difference value, the data corresponding to the same read address of the Path 0 RAM unit 330 and the Path 1 RAM unit 340 are exactly the same, thereby realizing a lossless switchover.

The switchover controlling unit 350 generates a read address and a clock gap. When the clock gap is valid, it indicates that the clock is invalid; and when the clock gap is invalid, it indicates that the clock is valid. In other words, an equivalent low-speed clock is obtained by combining the clock gap and the clock. The clock gap means that the valid indication of the clock gap is quite uniform. The switchover controlling unit 350 operates in the domain of the high-speed local oscillator clock. When the active/standby selection control is switched to a certain path, the switchover controlling unit 350 locks the current output water line of this path as the phase discriminator water line, and subsequently adjusts to speed up or slow down the read speed of the path RAM units by generating a high-speed clock gap. In this manner, the current water line of the selected working path is ensured to remain at the position of the phase discriminator water line, and the read address itself is added by 1 in each valid high-speed local oscillator clock period.

The clock gap is generated by means of an adaptive switchover between a rapid gap mode and a slow gap mode. When it is detected that the water line of the selected working path remains to be lower than the phase discriminator water line, it indicates that the read operation of the working path is slower than the write operation, and thus the clock gap is switched to a rapid gap mode. When it is detected that the water line of the selected working path remains to be higher than the phase discriminator water line, it indicates that the read operation of the working path is faster than the write operation, and thus the clock gap is switched to a slow gap mode. When it is detected that the water line of the selected working path remains to be equal to the phase discriminator water line, the rapid gap mode and the slow gap mode are alternately adopted.

The rapid gap and slow gap are determined in the following manner. It is assumed that a frequency of the high-speed local oscillator clock is set as $f_1$, and a frequency of the service clock is set as $f_2$. A nominal clock gap coefficient is m, i.e., m high-speed local oscillator clock periods+1 high-speed local oscillator clock gap=the service clock.

Therefore, the relation between the service clock and the high-speed local oscillator clock is shown in Formula (1):

$$\frac{m}{m+1} f_1 = f_2. \tag{1}$$

The nominal clock gap coefficient m calculated by Formula (1) is shown in Formula (2):

$$m = f_1/(f_2 - f_1) \tag{2}.$$

Two integers X and Y are determined according to a frequency offset range of the high-speed local oscillator clock and a frequency offset range of the service clock by Formula (2), X is smaller than Y, and X and Y respectively serve as a slow gap coefficient and a rapid gap coefficient. That is, the slow gap is equal to X high-speed local oscillator clock periods +1 high-speed local oscillator clock gap, and the rapid gap is equal to Y high-speed local oscillator clock periods+1 high-speed local oscillator clock gap. As the clock gap generated by the switchover controlling unit is relatively smooth, no additional jittering occurs, so that downstream mapping, de-mapping, and relay units are rarely affected, and thus the jittering performance of the network clock may not be aggravated.

The active/standby switchover data selecting unit 360 is adapted to select the aligned data of the working path output by the path data storing unit of the working path as the active/standby switchover data to be output.

Figure 4:
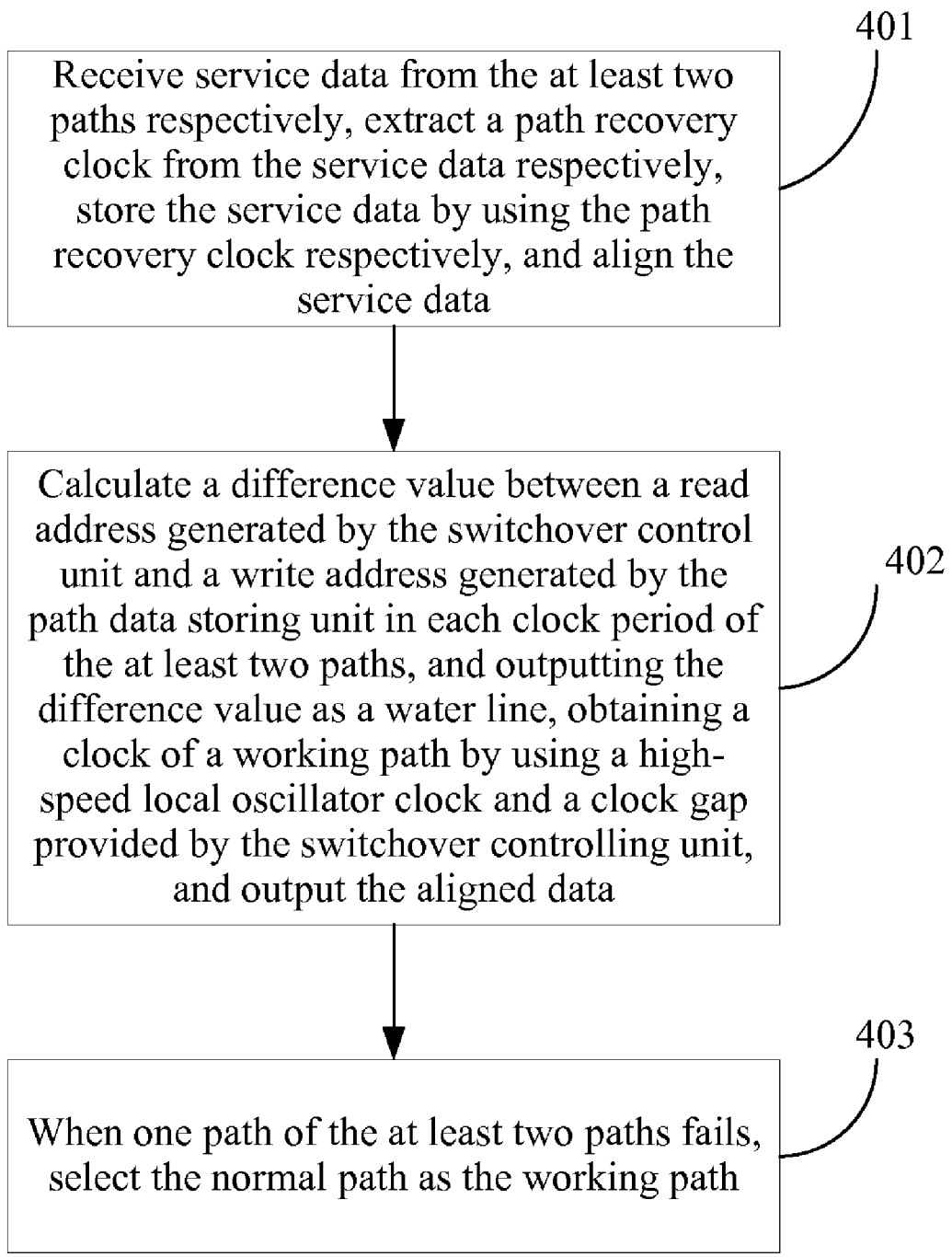
FIG. 4 is a flow chart of an active/standby switchover method of an asynchronous backplane in an OTN according to a first embodiment of the present disclosure.

An active/standby switchover method of an asynchronous backplane in an OTN is also provided in an embodiment of the present disclosure. The method is applicable to a system including a switchover controlling unit, an active/standby switchover data selecting unit, and at least two paths, in which each path is provided with a path clock data recovering unit and a path data storing unit. Referring to FIG. 4, the method includes the following blocks.

Block 401: Service data from the at least two paths are received respectively, a path recovery clock is extracted from the service data respectively, the service data are respectively stored according to the path recovery clock, and the service data are then aligned. The aligning the service data is implemented as follows. A frame header of the service data is fixedly stored as an initial address, so as to generate the aligned data. For example, the frame header is fixedly written into Byte 0 of a buffer, and the subsequent data are sequentially written into the buffer. In this manner, when the service data are read, all the service data are read beginning from Byte 0, thereby ensuring the alignment of the service data when being output.

Block 402: A difference value between a read address generated by the switchover controlling unit and a write address generated by each of the path data storing units is calculated in each clock period of the at least two paths to serve as a water line, and the water lines are then output. Furthermore, a simulated clock of a working path is obtained by using a high-speed local oscillator clock and a clock gap provided by the switchover controlling unit, and the aligned data is then output. The specific implementation is as follows. The high-speed local oscillator clock is mixed with the clock gap provided by the switchover controlling unit, a frequency of the high-speed local oscillator clock is lowered to obtain the clock of the working path, and the aligned data at the read address generated by the switchover controlling unit is read according to the obtained clock of the working path.

In addition, the clock gap is generated according to the phase discriminator water line and the received water lines, and the phase discriminator water line is generated by latching the water line output by the working path. The specific implementation is as follows. When it is detected that the water line of the selected working path is lower than the phase discriminator water line, the clock gap is switched to a rapid gap mode. When it is detected that the water line of the selected working path is higher than the phase discriminator water line, the clock gap is switched to a slow gap mode. When it is detected that the water line of the selected working path is equal to the phase discriminator water line, the rapid gap mode and the slow gap mode are alternately adopted.

Block 403: When one path of the at least two paths fails, the other normal path is selected as the working path.

In the embodiments of the present disclosure, a clock of the working path obtained by using the high-speed local oscillator clock is adapted to replace the clock of the working path tracked in a phase-locked loop mode. An active/standby switchover operation is realized by using the high-speed local oscillator clock, so that the implementation cost is greatly reduced, and the hysteresis problem of the phase-locked loop tracking clock during the active/standby clock switchover is eliminated, thereby effectively achieving the lossless switchover of services.

Through the description of the above embodiments, those skilled in the art should understand that the present disclosure may be implemented by software on a necessary universal hardware platform, or, definitely, implemented by hardware, and in many cases, the former is more preferred. Based on the above, the technical solutions of the present disclosure or the part contributed to the conventional art may be implemented by a software product. The computer software product is stored in a storage medium, and includes several instructions to enable a computer equipment (for example, a personal computer, server, or network equipment) to perform the method provided by the embodiments of the present disclosure.

Finally, it should be understood that the above embodiments are only used to explain, but not to limit the technical solution of the present disclosure. In despite of the detailed description of the present disclosure with referring to above preferred embodiments, it should be understood that various modifications, changes or equivalent replacements can be made by those skilled in the art without departing from the spirit and scope of the present disclosure and covered in the claims of the present disclosure.

What is claimed is:

1. An active/standby switchover device of an asynchronous backplane in a transport network, wherein there are at least two paths for aligning and outputting service data adapted in the active/standby switchover device, and each of the at least two paths comprises:
    a switchover controlling unit, configured to generate a clock gap;
    a path clock data recovering unit, configured to receive service data from an external path and extract a path recovery clock from the service data; and
    a path data storing unit, configured to store the service data received by the path clock data recovering unit according to the path recovery clock, align the service data, obtain a clock of a working path by using a local oscillator clock and the clock gap provided by the switchover controlling unit, and then output the aligned service data according to the clock of the working path the active/standby switchover device further comprises:
    an active/standby switchover data selecting unit, configured to select normal path aligned data as working path data for outputting from the at least two paths,
    the switchover controlling unit comprises:
    a water line receiving unit configured to receive a water line sent by the path data storing unit;
    a phase discriminator water line generating unit, configured to latch a water line outputted by a current working path as a phase discriminator water line; and
    a clock gap generating unit, configured to generate the clock gap according to the phase discriminator water line and the received water line.

2. The active/standby switchover device according to claim 1, wherein
    the switchover controlling unit further comprises:
    a read address generating unit, configured to obtain a read address according to the clock gap,
    the path data storing unit comprises:
    a data writing unit, configured to store the service data received by the path clock data recovering unit by using the path recovery clock, and fixedly write a frame header of the service data into an initial address of the path data storing unit;
    a water line outputting unit, configured to calculate a difference value between a read and a write addresses in each clock period to serve as the water line, and output the water line to the switchover controlling unit; and
    a data reading unit, configured to mix the local oscillator clock with the clock gap provided by the switchover controlling unit, lower a frequency of the local oscillator clock to obtain the clock of the working path, output the aligned data in the data writing unit corresponding to the read address generated by the switchover controlling unit by using the obtained clock of the working path.

3. The active/standby switchover device according to claim 1, wherein the clock gap generating unit comprises:
    a detecting sub-unit, configured to detect the water line of the current working path and the phase discriminator water line; and
    an adjusting sub-unit, configured to switch the clock gap to a rapid gap mode when it is detected that the water line of a selected working path is lower than the phase discriminator water line, switch the clock gap to a slow gap mode when it is detected that the water line of the selected working path is higher than the phase discriminator water line, and alternately switch the clock gap between the rapid gap mode and the slow gap mode when it is detected that the water line of the selected working path is equal to the phase discriminator water line.

4. An active/standby switchover method applied to an asynchronous backplane in a transport network, applied to a system comprising a switchover controlling unit and at least two paths, each of the at least two paths comprises a path data storing unit, the method comprising:
    receiving service data from the at least two paths respectively, extracting a path recovery clock from the service data respectively, storing the service data respectively according to the path recovery clock and aligning the service data respectively;
    calculating a difference value between a read address generated by the switchover controlling unit and a write address generated by the path data storing unit in each clock period of the at least two paths, and outputting the difference value as a water line, obtaining a clock of a working path by using a local oscillator clock and a clock gap provided by the switchover controlling unit and outputting the aligned service data; and selecting a normal path as the working path when one of the at least two paths fails, wherein, the obtaining the clock of the working path by using the local oscillator clock and the clock gap provided by the switchover controlling unit and outputting the aligned service data comprises:

mixing the local oscillator clock with the clock gap provided by the switchover controlling unit, lowering a frequency of the local oscillator clock to obtain the clock of the working path, and reading the aligned service data at the read address generated by the switchover controlling unit according to the obtained clock of the working path.

5. The active/standby switchover method according to claim 4, wherein the aligning the service data comprises:

fixedly storing a frame header of the service data as an initial address and generating the aligned service data.

6. The active/standby switchover method according to claim 4, wherein the clock gap is generated according to a phase discriminator water line and a received water line and the phase discriminator water line is generated by latching the water line output by the working path.

7. The active/standby switchover method according to claim 6, wherein the generating the clock gap according to the phase discriminator water line and the received water line comprises:

switching the clock gap to a rapid gap mode when it is detected that the water line of a selected working path is lower than the phase discriminator water line, switching the clock gap to a slow gap mode when it is detected that the water line of the selected working path is higher than the phase discriminator water line, and alternately switching the clock gap between the rapid gap mode and the slow gap mode when it is detected that the water line of the selected working path is equal to the phase discriminator water line.

8. A non-transitory computer readable storage medium including program codes stored thereon for instructing one or more digital processors, the program codes comprises:

instructions for receiving service data from at least two paths respectively, extracting a path recovery clock from the service data respectively, storing the service data respectively according to the path recovery clock and aligning the service data respectively;

instructions for calculating a difference value between a read address generated by a switchover controlling unit and a write address generated by a path data storing unit in each clock period of the at least two paths, and outputting the difference value as a water line, obtaining a clock of a working path by using a local oscillator clock and a clock gap provided by the switchover controlling unit and outputting the aligned service data; and instructions for selecting a normal path as the working path when one of the at least two paths fails, wherein the instructions for obtaining the clock of the working path by using the local oscillator clock and the clock gap provided by the switchover controlling unit and outputting the aligned service data further comprises:

the instructions for mixing the local oscillator clock with the clock gap provided by the switchover controlling unit, lowering a frequency of the local oscillator clock to obtain the clock of the working path, and reading the aligned data at the read address generated by the switchover controlling unit according to the obtained clock of the working path.

\* \* \* \* \*